May 21, 1940.   R. W. SCOTT ET AL   2,201,798
CIRCUIT CONTROLLER
Filed April 12, 1937   6 Sheets-Sheet 1
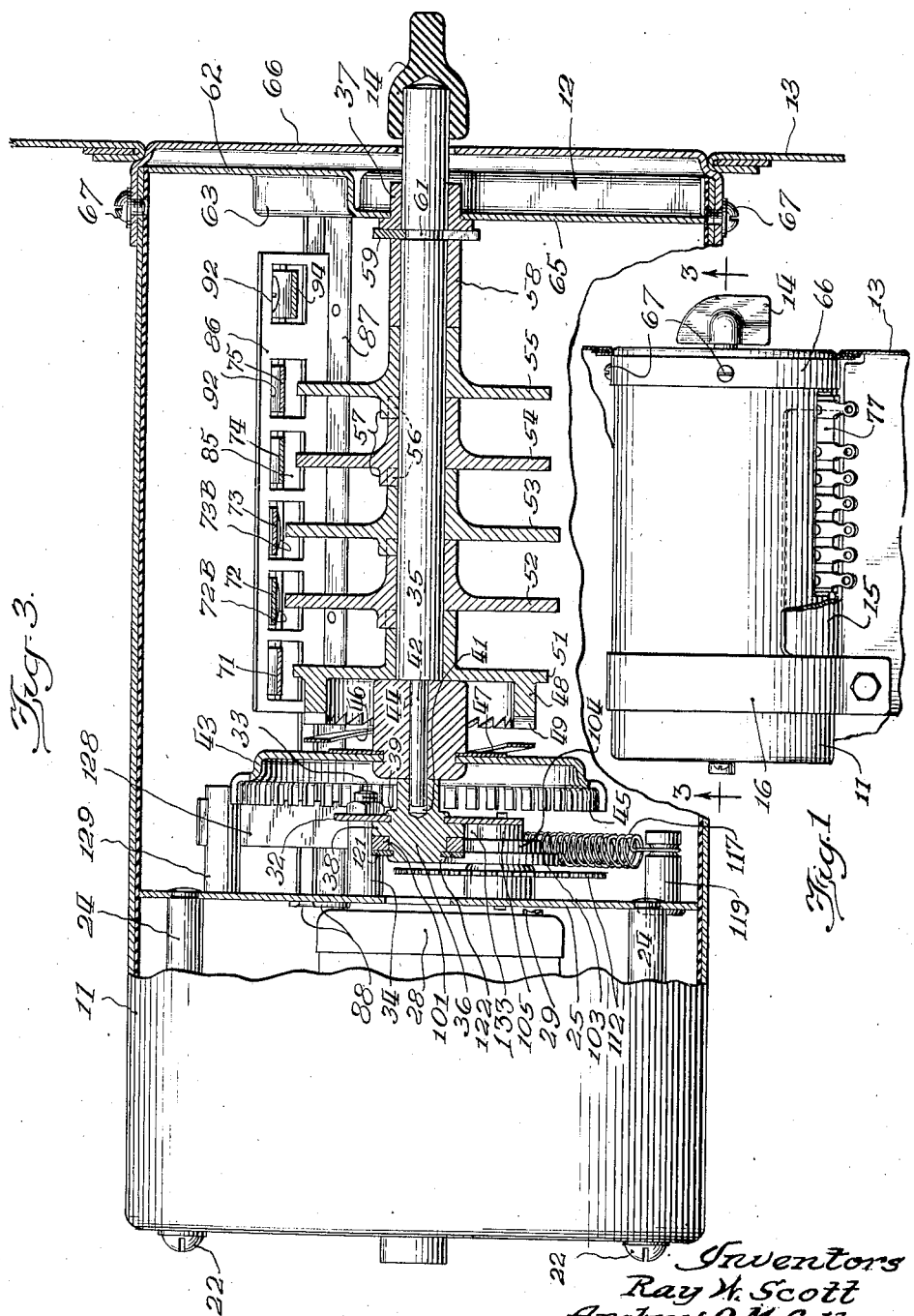
Inventors
Ray W. Scott
Andrew O. McCollum
By Williams, Bradbury, McCaleb & Hinkle
Attys.

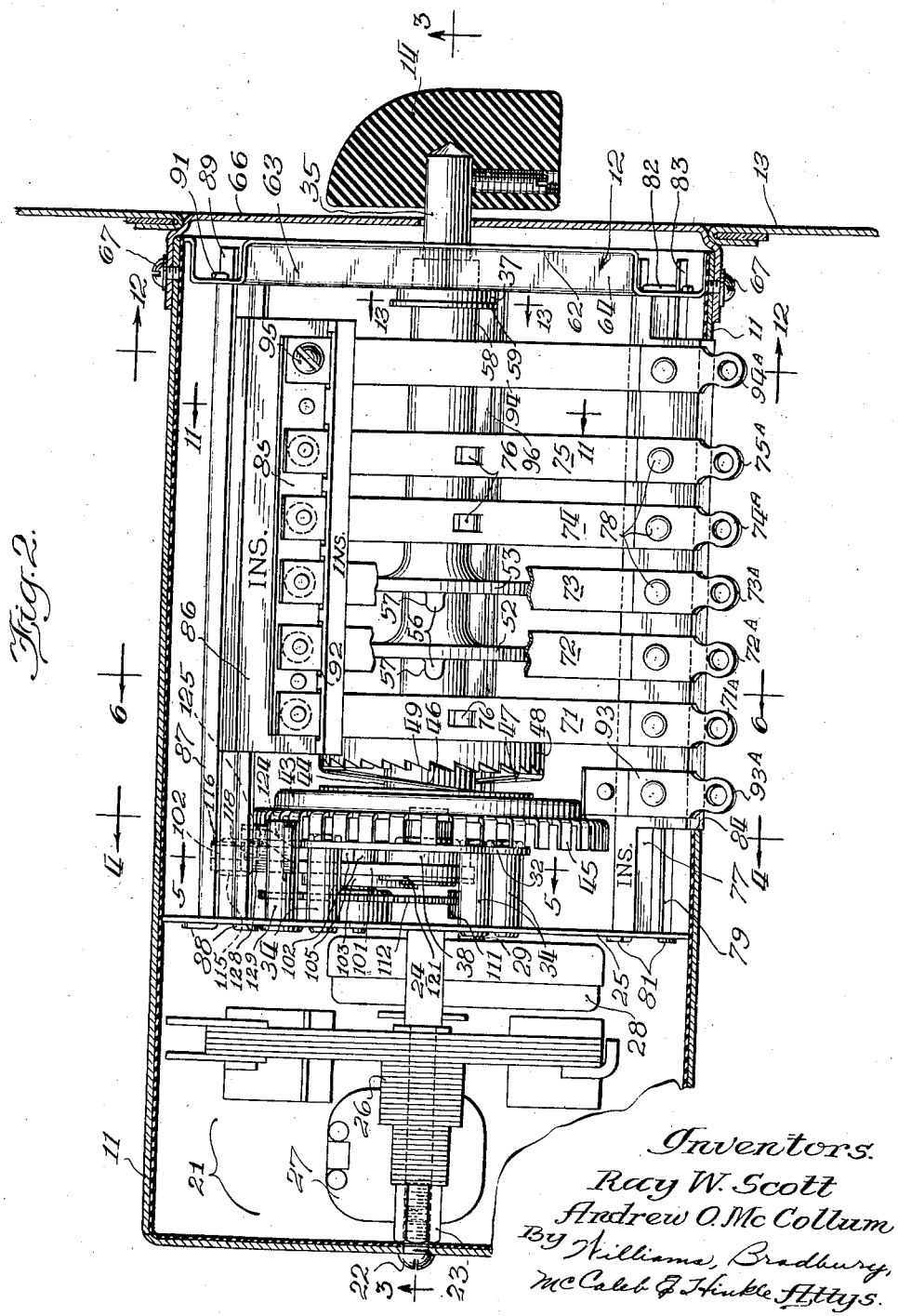

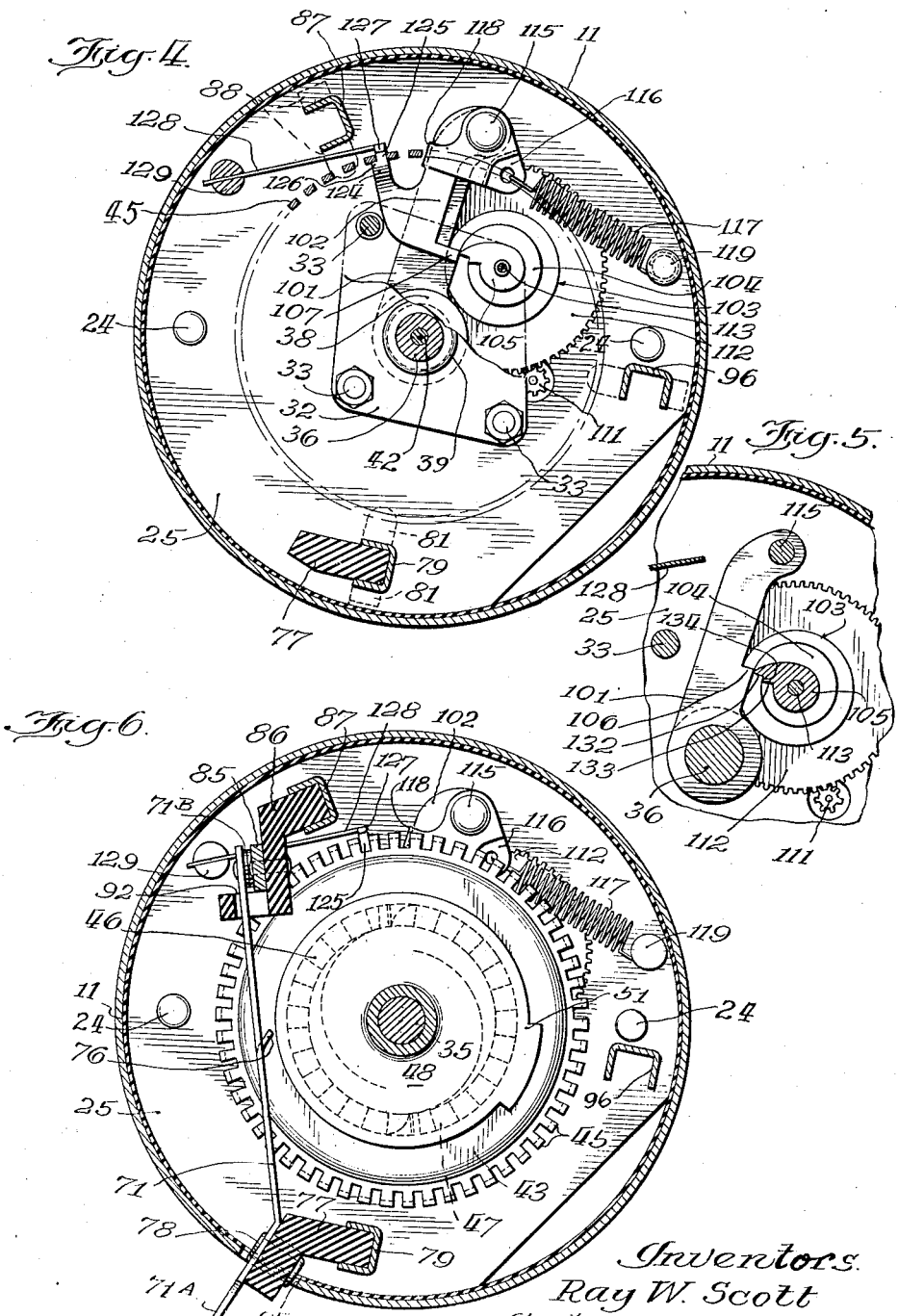

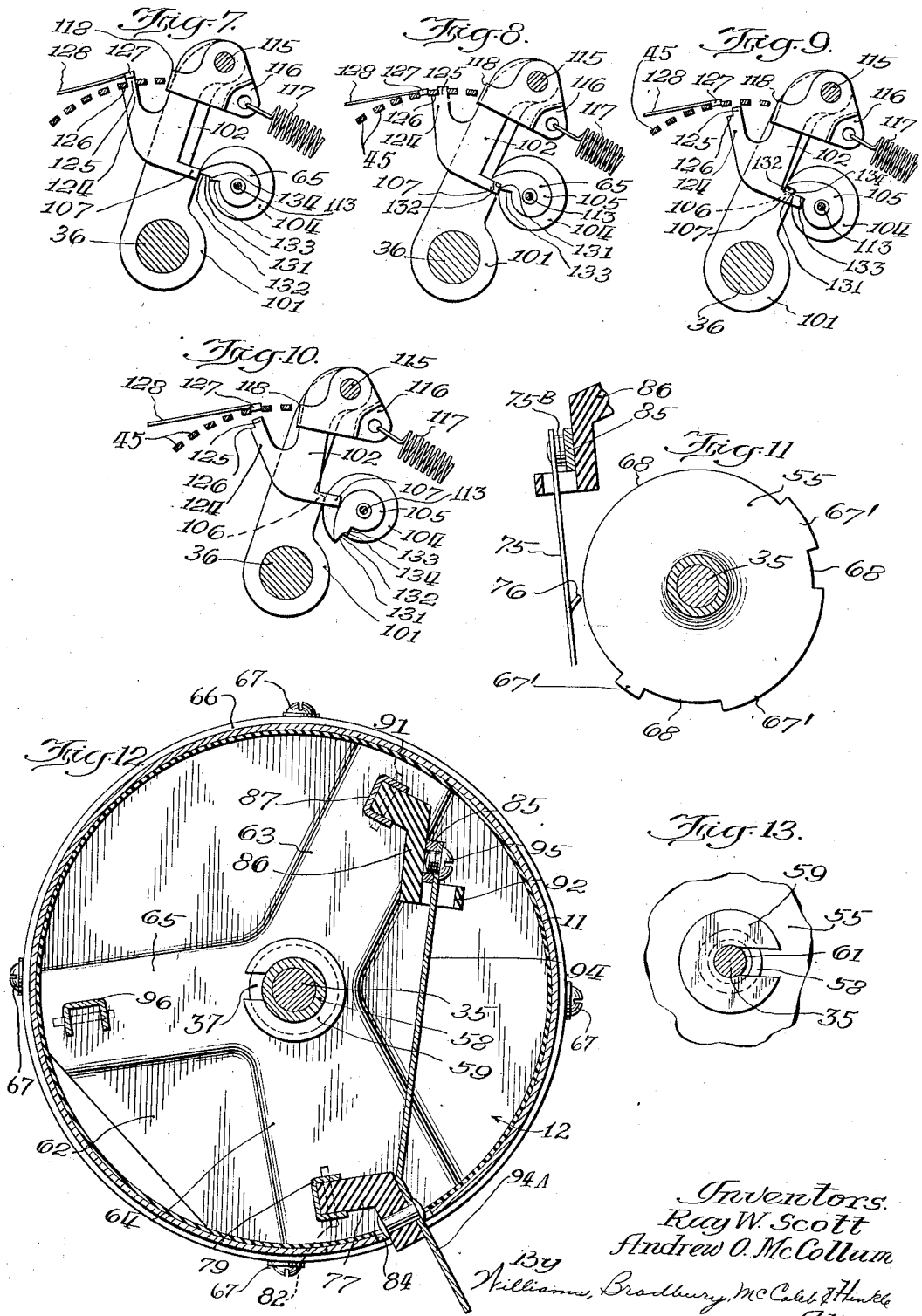

May 21, 1940.  R. W. SCOTT ET AL  2,201,798
CIRCUIT CONTROLLER
Filed April 12, 1937  6 Sheets-Sheet 5

Inventors.
Ray W. Scott
Andrew O. McCollum
By
Williams, Bradbury, McCaleb & Hinkle,
Attys.

May 21, 1940.　　　R. W. SCOTT ET AL　　　2,201,798
CIRCUIT CONTROLLER
Filed April 12, 1937　　　6 Sheets-Sheet 6
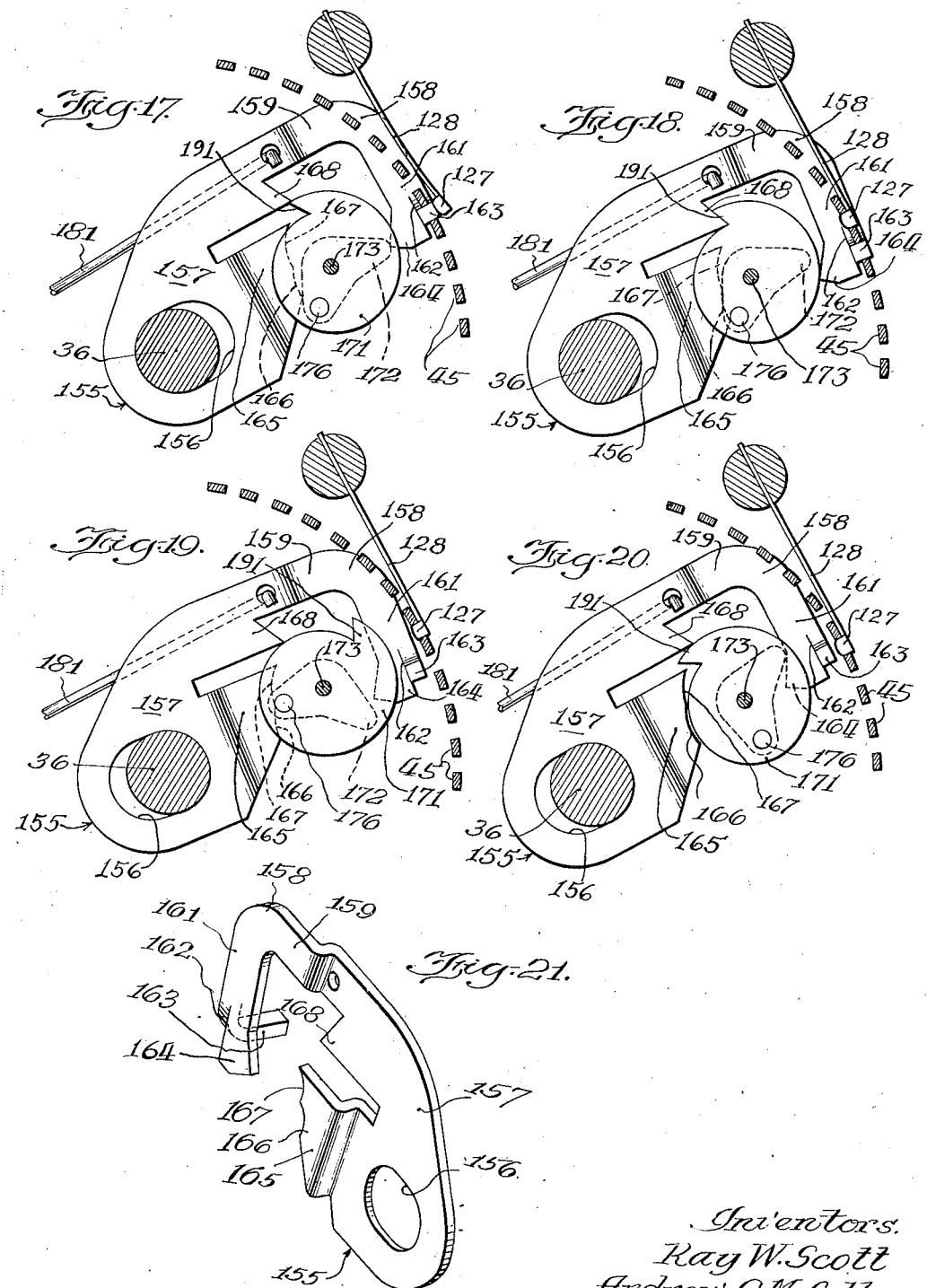

Patented May 21, 1940

2,201,798

UNITED STATES PATENT OFFICE 2,201,798

CIRCUIT CONTROLLER

Ray W. Scott and Andrew O. McCollum, Detroit, Mich., assignors to Bendix Home Appliances, Inc., Detroit, Mich., a corporation of Delaware Application April 12, 1937, Serial No. 136,512

19 Claims. (Cl. 74—125)

The present invention relates to circuit controllers and particularly to rotary circuit controllers of the type rotated in a predetermined direction in periodic steps by means of a pawl and ratchet mechanism actuated by a constant speed motor.

The primary object of the present invention is to provide means operable positively to rotate the controller in periodic movements of predetermined length.

A more specific object of the invention is to provide an improved escapement mechanism operable by a constant speed motor and adapted to drive circuit controlling means in a single direction positively and in periodic steps of uniform length.

Another object of the invention is to provide an improved escapement mechanism in which rotation is imparted to a cam shaft by an escapement mechanism comprising a tooth wheel secured to the shaft, cam means and a lever actuated thereby, the cam means and lever being so constructed and arranged that a projecting portion of said lever is periodically moved to engage said tooth wheel, then moved to rotate said wheel, thereafter disengaged from said wheel, and finally returned to its original position ready for the next operation.

A further object of the invention is to provide a new and improved circuit controller that is compact, economical to manufacture and one which may be readily disassembled and reassembled in case repairs thereto are necessary.

Other objects and advantages of the invention will become apparent from the ensuing description of controllers embodying the invention. In the course of the description reference is had to the accompanying drawings, in which:

Fig. 1 is a fragmentary vertical section of a cabinet showing one form of a controller constructed in accordance with the present invention mounted therein;

Fig. 2 is a side elevation of the circuit controller shown in Fig. 1 with the enclosing casing shown in section;

Fig. 3 is a horizontal longitudinal section through the escapement mechanism and circuit controlling means of the controller;

Fig. 4 is a vertical transverse section taken along the line 4—4 of Fig. 2 with part of the escapement mechanism supporting structure broken away better to show the details of the mechanism itself;

Fig. 5 is a vertical transverse section taken along the line 5—5 of Fig. 2;

Fig. 6 is a vertical transverse section taken along the line 6—6 of Fig. 2;

Fig. 7 is a detailed view of the escapement mechanism showing the parts thereof in the positions they occupy just prior to the time movement is imparted to the cam shaft;

Fig. 8 is a view similar to that shown in Fig. 7 showing the parts of the escapement mechanism in the positions they occupy immediately after movement has been imparted to the cam shaft;

Fig. 9 is a view similar to Fig. 7 showing the parts of the escapement mechanism in the positions they occupy after the wheel engaging portion of the mechanism is moved out of engagement with the wheel;

Fig. 10 is a view similar to that shown in Fig. 7 showing the various parts of the mechanism in the positions they occupy just prior to the time the wheel engaging portion is moved into engagement with the wheel;

Fig. 11 is a fragmentary vertical transverse section taken along the line 11—11 of Fig. 2;

Fig. 12 is a vertical transverse section taken along the line 12—12 of Fig. 2;

Fig. 13 is a fragmentary vertical transverse section taken along the line 13—13 of Fig. 2;

Figure 14:
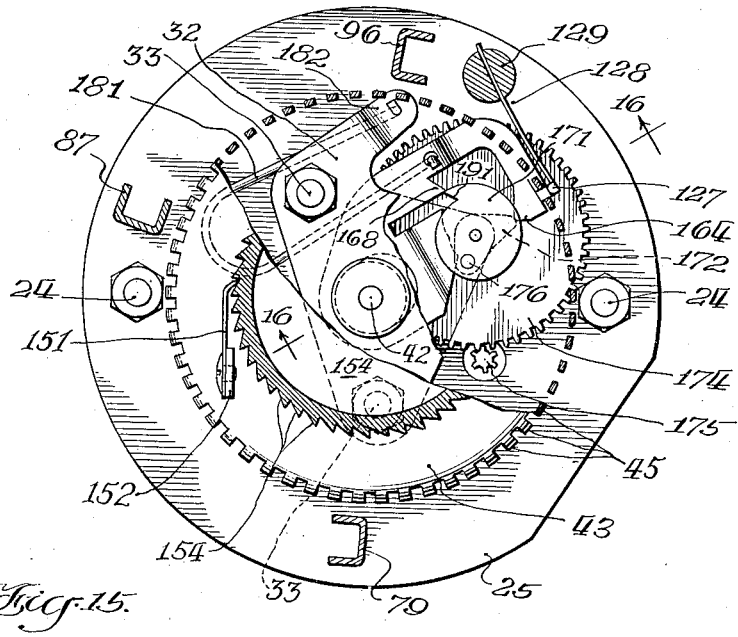
Fig. 14 is a view similar to Fig. 4 of a circuit controller provided with modified form of escapement mechanism.

Figs. 17 to 20, inclusive, are figures similar to Figs. 7 to 10, inclusive, showing the various positions of the escapement mechanism; and Fig. 21 is a perspective view of the escapement lever used in the modified form of escapement mechanism.

Referring first to Fig. 1, a circuit controller constructed in accordance with the present invention comprising an elongated cup-shaped casing 11 and a circular combined closure and front support 12 is shown mounted adjacent an opening formed in a wall 13 of a cabinet surrounding the apparatus to be controlled. The controller illustrated is adapted particularly for use with a washing machine, and is provided with a combined indicating and adjusting knob 14 extending outside the cabinet wall in order that the user may note the particular function being performed by the machine, as well as manually operate the controller to hasten or omit certain of the functions. The controller is securely fixed in position in the cabinet by mounting it upon a bracket support 15 to which it is strapped by a metallic band 16.

The controller may be driven by any suitable constant speed motor, such as a self-starting synchronous motor 21. The motor 21 is positioned in the rear end of casing 11 by means of a pair of diametrically opposite screw bolts 22 passing through apertures in the end of the casing into threaded engagement with a spacer 23. The spacer is threaded at its opposite end to a pair of studs 24 mounted on the rear side of the substantially circular rear support 25. The studs 24 support the field core 26 of the motor which is magnetically energized by the field coil 27 surrounding and supported by a portion of the core. The coil 27 may be energized from any suitable source of electricity. The rotor (not shown) drives through suitable gearing housed within casing 28, a drive shaft 29 extending forward through an opening in the rear support 25.

The remaining parts of the circuit controller are supported by the rear support 25, the combined closure and front support 12, and a rectangular intermediate support 32. The intermediate support is secured to the rear support 25 by means of three threaded studs 33 mounted on the rear support and is spaced from the rear support by a spacing block 34 surrounding each of the studs.

The main cam shaft 35 is mounted for rotation in a metallic bearing bushing 36 and a bearing bushing 37 of insulating material, mounted in the intermediate and front supports, respectively. The bearing bushing 36, as may be noted from Fig. 3, is formed with an annular collar 38 and is secured to the intermediate support by rolling a portion 39 thereof to clamp the support between the collar and rolled portion. The bushing is also provided with a central hole 41 in which the reduced end 42 of the cam shaft is journaled.

Periodic movement is imparted to the cam shaft by an escapement mechanism to be described shortly and comprising a tooth wheel 43. The wheel 43 is fixedly secured to a hub 44 rotatably mounted on the reduced portion 42 of the cam shaft 35. The wheel is shaped like a cup and is provided with peripheral rectangular teeth 45 extending rearwardly parallel to the axis of the shaft.

A one-way driving connection between the tooth wheel and the cam shaft is provided by resilient pawls 46 and 47 secured at one end to the hub 44 and having their other ends in resilient engagement with a combined ratchet wheel and cam 48 made of suitable insulating material and secured to shaft 35. The wheel 48 is provided with lateral ratchet teeth 49 and a cam portion 51.

Mounted on the shaft adjacent the combined ratchet wheel and cam 48 is a series of similar cams 52 to 55, inclusive, also made of insulating material. The cams are all fixedly mounted on the shaft for rotation therewith and angular movement between the various cams is prevented further by interfitting tongues and grooves 56 and 57 formed on the hubs of each (see Fig. 2).

The front cam 55 is spaced from the front bearing bushing 37 by means of an insulating spacer 58 and both the cams and spacer are further held on the shaft by a C washer 59 carried in an annular groove 61 formed in the cam shaft 35 adjacent the bushing.

The front combined closure and bearing support 12, as may be noted from Figs. 3 and 12, consists of a substantially circular metallic bearing support 62 having stamped thereon three radially extending channels 63, 64 and 65, and a cup-shaped front closure 66. The support and closure are mounted side by side by means of screw bolts 67 passing through the closure and threaded into casing 11.

The cams 51 to 55, inclusive, may be provided with peripheral surfaces similar to that provided on cam 55 illustrated in Fig. 11. The peripheral surface comprises a plurality of raised portions 67' and a plurality of intermediate lower portions 68 therebetween.

The cams have associated therewith contact blades 71 to 75, inclusive, formed of some relatively resilient material, such as phosphor bronze. Each is provided with an inwardly extending projection 76 adapted to be engaged by the raised portions 67' of its associated cam as the cam is rotated.

The contact blades are supported on a mounting block 77 of insulating material to which they are fastened by rivets 78. The block is almost right angled in shape (see Figs. 6 and 12) and is supported in a metallic spacer 79 substantially U-shaped in cross-section and carried by the front and rear supports 62 and 25, respectively. The spacer 79 is secured to the rear support 25 by bent-over ears 81 projecting through apertures in the support and to the front support 62 by a pin 82 passing through parallel extensions 83 of the spacer passing through apertures in the front support. Very little space is taken up by the latter fastening means as it is located in the channel 64.

The contact blades have terminal portions 71A to 75A, inclusive, which extend outside the casing 11 through a longitudinal aperture 84 formed in the latter, as may be seen best from Figs. 2 and 6.

The contact blades carry movable contacts 71B to 75B, respectively, made of silver and secured to the blades as by riveting. The blades are mounted so that the movable contacts are biased into circuit closing relation with a longitudinal contact bar 85 riveted to a contact bar carrier 86 made of insulating material. The bar carrier is supported on a spacer 87, similar in all respects to spacer 79 and secured to support 25 by bent-over ear portions 88 and to the front support 62 by extensions 89 and pin 91.

The bar carrier 86 is similar in shape to mounting block 77, but differs from the latter in that it is provided with a plurality of apertures 92 through which the respective blades extend, for guiding the contact blades and preventing them from coming into contact with each other.

In addition to the contact blades 71 to 75 a motor connector 93 and a contact bar connector 94 are supported on the mounting block 77. The former is relatively short and is adapted to be connected to one terminal of the motor (the connection not being shown). The latter extends directly to the contact bar 85 to which it is fastened by a screw bolt 95. The connectors are secured to the block by rivets 78 and are likewise provided with terminals 93A and 94A.

The electrical connections have been omitted, but they may take any of the forms well known to those skilled in the art. They may take the form of the connections disclosed in the copending applications of Rex Earl Bassett, Jr., Serial No. 6,425, filed February 14, 1935, or Aaron A.

Loweke, Serial No. 78,692, filed May 8, 1936, or of Rex Earl Bassett, Jr., and John W. Chamberlin, Serial No. 129,429, filed March 6, 1937. The last mentioned application, in particular, contains a complete discussion of the washing cycle for which the present controller is specifically designed. In general, the connections may be such that the terminal 94 is connected to one side of a suitable source of supply of electrical energy and the terminals of the switch blades to one terminal of each of the control devices. The other terminal of each control device is connected to the other side of the source of supply of electrical energy so that when a switch is closed by its associated cam, the control device is energized. Preferably the control motor 21 is connected in circuit with one of the switches so that once the switches are moved from the "off" position by movement of the cam shaft by the indicating knob, the motor remains energized until the cycle of operations has been completed.

Additional rigidity is given to the controller by a third spacer 96 which is fastened to the rear and front supports in the same manner as spacers 79 and 87. There are thus provided three spacers positioned at equal distances from each other and connecting the front and rear supports rigidly together. While the structure is rigid it may be taken apart as well as assembled quite readily.

The escapement mechanism, through which periodic movement is imparted to the cam shaft, is mounted between the rear support 25 and the intermediate support 32. The mechanism comprises a pair of pivotally mounted levers 101 and 102 and a multiple section cam 103 provided with primary and secondary cam surfaces 104 and 105 adapted to engage a shoulder 106 formed on lever 101 and a projection 107 formed on lever 102, respectively.

The cam 103 is rotated at constant speed by the motor 21 through a pinion 111 mounted at the end of the drive shaft 29. The pinion drives a spur gear 112 fixedly mounted on a secondary cam shaft 113 upon which the cam 103 is also mounted. The shaft 113 is rotatably mounted in the rear support 25 and the intermediate support 32 approximately midway between the axis of the main cam shaft 35 and the periphery of tooth wheel 43.

The cam surfaces are formed with constant rise and constant radius portions in order to actuate the levers 101 and 102 in a predetermined manner. Both the movement of the levers and the construction of the cams will be described in detail shortly.

Referring now particularly to Figs. 2 and 4, it may be noted that the outer end of lever 101, which constitutes a walking beam and will be so referred to hereinafter, extends somewhat beyond the periphery of the tooth wheel 43 and is provided at its free end with a pivot pin 115 supporting the lever 102. The lever 102, which constitutes an escapement lever and will be so referred to hereinafter, extends generally toward the axis of the cam shaft 35 and it may be noted that in certain positions (see Figs. 4, 7 and 8) the shoulder formed by projection 107 thereof coincides with the shoulder 106 of the walking beam.

The walking beam and escapement lever shoulders 106 and 107 are maintained in engagement with their respective cams 104 and 105 by a spring clip 116 and a helical spring 117. The spring clip is pivotally mounted on the pivot pin 115 adjacent the escapement lever 102 and is provided with a flanged finger 118 adapted to engage the side of the lever. The spring 117, which is secured to the rear support 25 by a stud 119, is under tension and maintains the finger 118 in engagement with the escapement lever 102 and thereby serves to maintain escapement lever 102 in engagement with cam 105. The spring acts through the pivot pin 115 to maintain the walking beam 101 in engagement with cam 104.

The walking beam 101 is pivotally mounted coaxially with respect to the axis of cam shaft 35 upon the bearing bushing 36 by means of a washer 121 held in place by a rolled-over portion 122 of the bushing. The beam is thus located adjacent the tooth wheel with the escapement lever therebetween and the wheel.

Movement is imparted to the tooth wheel in a clockwise direction, is viewed in Figs. 4, 6 and 7 to 10, inclusive, by the escapement lever 102 which is provided with an axially and radially extending projection 124 (see Fig. 2). The latter terminates in a relatively narrow radially extending finger 125 adapted to be moved radially outward into a position between the teeth. In order to prevent the finger from entering too far, there is provided a shoulder 126 adapted to engage the inner side of an adjacent tooth.

When the finger 125 is moved into the position shown in Figs. 4 and 7, it forces a tooth wheel lock 127 formed at the free end of a resilient arm 128 secured at its opposite end to a stud 129 mounted upon the rear support 25 out of its locking position between the teeth of the wheel. Thereafter, when movement is imparted to wheel, the lock 127 first rides on the outer surface of a tooth and then falls into the next space, thereby positively preventing further motion of the wheel. However, as will be explained shortly, the movement of the projecting finger is made to equal the width of a tooth so that no undue strain is placed on either the escapement mechanism or lock when periodic movement is imparted to the escapement mechanism upon rotation of the cams.

The cam surfaces are so formed that the projecting finger 125 of the escapement mechanism is moved in a closed path during only a portion of which movement is imparted thereby to the tooth wheel 43. The projection is moved radially alternately into and out of a position between the teeth on the wheel 43. After being moved in between the teeth, it is moved in clockwise direction to impart movement to the wheel and after being moved out of a position between the teeth it is moved in the opposite direction to return it to what is termed its initial position.

This movement of the finger 125 is obtained by constructing the primary cam 104 with a single step 131 and the secondary cam with two steps 132 and 133, the former corresponding in size and location with step 131 (see Figs. 4, 5 and 7 to 10, inclusive). Step 133 occurs 10° after steps 131 and 132, thereby defining a short cam surface 134 which prevents radial inward movement of projection 125 for a short time after movement has been imparted to the tooth wheel by simultaneous movement of the walking beam 101 and escapement lever 102.

Cam 104 has a constant rise from the foot of step 131 for a distance of 300° (in a clockwise direction as viewed in the last mentioned figures) and a constant radius for the remaining 60°. Cam 105 has a constant rise of relatively small magnitude from the foot of step 133 for a distance of 290°, then a greater constant rise for 60° to step 132, and then the constant radius portion 134 of 10° previously mentioned.

The movement of the tooth wheel by the escapement mechanism may be understood better from a complete description of a cycle of operation thereof. To place the controller in operation the manually operable adjusting and indicating knob 14 is rotated in a clockwise direction, looking toward the rear, thereby to rotate the cam shaft 35 to a position wherein an energizing circuit to the motor 21 is closed. The movement of cam shaft 35 manually does not affect the escapement mechanism because of the one-way connection provided by pawls 46 and 47 and the ratchet teeth 49.

Once the circuit to the motor is closed, the motor drives, it will be assumed, the cam shaft and cams approximately 360° to effect performance of a complete cycle of operations by the apparatus being controlled. If the apparatus is a washing machine the control may be arranged as described in the previously mentioned applications of Rex Earl Bassett Jr., and Aaron A. Loweke.

The energization of motor 21 results in the rotation of its rotor and the latter drives the secondary cam shaft 113, upon which the cam 103 is mounted, at a constant speed. The driving connection extends through the gears in casing 28, drive shaft 29, pinion 111, and spur gear 112.

The primary and secondary cam surfaces 104 and 105 thereby effect oscillatory movement of the walking beam 101 and escapement lever 102. The movement of the beam and lever causes the projecting finger 125 periodically to be moved into engagement with successive teeth on the tooth wheel 43 to impart an intermittent rotary movement to the latter and to the cam shaft 35.

Referring first to Fig. 7, the walking beam and escapement lever are shown in their extreme counterclockwise positions with respect to the axis of the cam shaft to which position they have been moved by cams 104 and 105 against the tension of the spring 117. In addition, the escapement lever is in its extreme clockwise position with respect to the pivot pin 115 upon which it is mounted. Thus the projecting finger 125 is at its extreme counterclockwise position and at its outermost position radially from the axis of the cam shaft.

In the position of Fig. 7 the wheel lock 127 has been lifted from engagement by the finger 125 and the shoulder 126 rests against the inner side of one of the teeth on the wheel.

Continued rotation of the cam in a clockwise direction causes shoulders 106 and 107 of the beam and lever, respectively, to fall off steps 131 and 132 under the action of spring 117, the former to its extreme clockwise position and the latter into engagement with the short surface 134, as indicated in Fig 8. The effect of this operation is solely to rotate the tooth wheel one step, the escapement lever being maintained in the same relative position with respect to the walking beam. Thus, the finger 125 remains in a position between the teeth of the wheel and actuates the wheel a distance determined by the steps 131 and 132, a distance designed to be one tooth space. The wheel lock 127 falls between the next pair of teeth upon completion of the movement of the wheel.

The escapement lever remains in the position indicated in Fig. 8 and the beam is moved a slight distance in a counterclockwise direction until the shoulder 107 of the lever falls off step 132. This operation results in a relative movement between the beam and lever, the latter moving counterclockwise about the pivot pin 115, whereby the projecting finger 125 is withdrawn from in between the teeth. Its movement is radially inward toward the axis of the cam shaft.

Thereafter the continued rotation of the cams results in a gradual movement of both the beam and lever in a counterclockwise direction about the axis of the cam shaft and a further relative movement between the beam and lever, occasioned by the fact that the rise of cam 104 is steeper than the rise of cam 105. Thus the beam is moved angularly at a greater rate than the lever and the angular displacement between the two is varied. This action continues until the cams reach the position indicated in Fig. 10.

At this time the shoulder 106 of the beam reaches the constant radius portion of the cam 104 and remains stationary. However, shoulder 107 reaches the steep rising part of cam 105 and is moved in a clockwise direction, whereby finger 125 of the lever is moved radially outward into the position illustrated in Fig. 10.

Continued rotation of the cams results in the above described cyclic movement of the escapement mechanism and, therefore, in the periodic movement of the tooth wheel and cam shaft. Upon each rotation of the cams, the primary cam shaft is moved a predetermined distance by the coaction of the spring and cams.

The construction described permits the use of a relatively heavy spring 117 without danger of causing "overrunning" of the cam shaft, because the shaft is moved a definite distance each time. The use of a heavy spring increases the rapidity of the movement of the cam shaft and thereby decreases arcing at the contacts.

In the description of the modified form of controller shown in Figs. 14 to 21, inclusive, which differs from the previously described modification in the construction of the escapement mechanism, like parts are denoted by the same reference numerals. The entire controller has not been illustrated in detail because, as just stated, the distinction between the two resides in the escapement mechanism.

The escapement mechanism of the modification to be described, consists of a single lever having a plurality of projections cooperatively associated with cams to give a finger portion thereof the same movement imparted to the finger 125 of the previously described modification.

Figure 15:
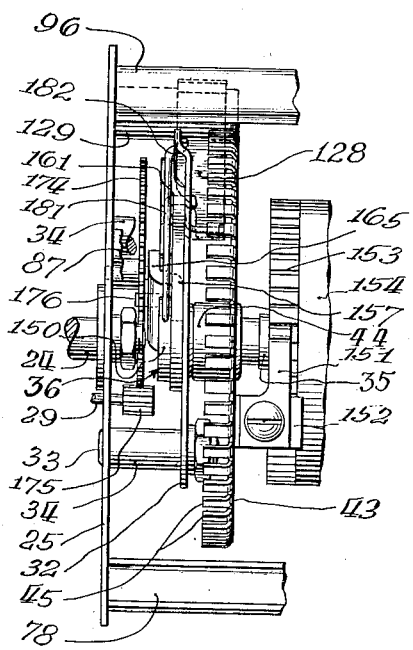
Fig. 15 is a fragmentary side plan view of the controller shown in Fig. 14, with part of the escapement mechanism supporting structure broken away better to illustrate the details of the mechanism itself.
Figure 16:
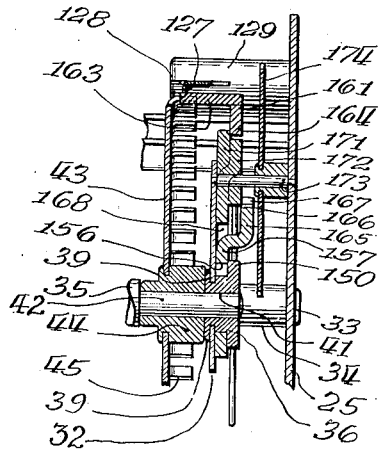
Fig. 16 is a fragmentary longitudinal section taken along the lines 16—16 of Fig. 14.

Referring first to Figs. 14, 15 and 16, it may be seen that the escapement mechanism is mounted between the rear support 25 and an intermediate support 32 secured to the former by means of a pair of threaded studs 33 and spaced therefrom by spacing blocks 34 surrounding the studs. The motor 21 (not shown) is secured to the rear support by a pair of studs 24 and the drive shaft 29 of the motor extends through an aperture formed in the support.

The front end of the main cam shaft 35 is mounted for rotation in a metallic bearing bushing 36 mounted in the intermediate support 32. The bushing 36, as may be noted from Figs. 15 and 16, is formed with an annular collar 38 and is secured to the intermediate support by rolling a portion 39 thereof to clamp the support between the collar and rolled portion. The bearing is provided with a central hole 41 in which the reduced end 42 of the cam shaft is mounted.

Periodic movement is imparted to the cam shaft by an escapement mechanism to be described shortly and comprising a tooth wheel 43. The wheel 43 is fixedly secured to a hub 44 rotatably mounted on the reduced portion 42 of the cam shaft. The wheel is cup-shaped and is provided with peripheral rectangular teeth 45 extending rearwardly parallel to the axis of the shaft.

A one-way driving connection between the tooth wheel and cam shaft is provided by a resilient pawl 151 secured to a projection 152 secured in suitable manner to the front side of wheel 43 and adapted to engage ratchet teeth 153 formed on the periphery of a combined cam and ratchet wheel 154. The combined cam and ratchet wheel is fixedly secured to the cam shaft so that when the wheel is moved by the escapement mechanism the shaft is rotated thereby.

The remainder of the cams, contact blades, etc., have been omitted from the figures, but it is evident that they may take the forms previously described.

The single escapement lever of the present modification is indicated generally by the reference numeral 155 and the details of its construction may be noted best from Fig. 21. Before describing these details, it may be well to note that the lever is mounted for both pivotal and radial movement coaxially of the cam shaft 35 upon the collar 38 of the bearing bushing 36. It is secured against axial displacement by a shoulder 150 formed on the rear end of the bushing.

Referring now to Fig. 21 it may be seen that the lever is formed in the shape of a hook and that it is provided with an oblong aperture 156 having a width approximately equal to and a length somewhat greater than the diameter of the collar 38 so that it may move both pivotally and radially thereabout.

The axial portion 157 of the lever is relatively flat whereas the end portion 158 is stamped so as to lie in a plane parallel to the flat portion, but displaced therefrom a distance equal to the thickness of the lever. The end portion 158 comprises a relatively narrow portion 159 extending radially outward from the base portion 158 and a transversely extending portion 161 lying at right angles to portion 159. The portion 161 is split at its end as indicated at 162, and the outer extremity thereof bent at right angles thereto to form a finger 163 which corresponds to finger 125 of the previous modification. A generally triangular projection 164 extending toward aperture 156 is formed at the inner side of the portion 161.

Substantially opposite to the projection 164, but displaced from the plane of the latter by a distance approximately equal to the thickness of the lever, is a projection 165 comprising curved cam surfaces 166 and 167.

Formed intermediate the projections 164 and 165 is a transversely extending pointed projection 168 lying in the plane of the base portion 157.

The projections 164, 165 and 168 are adapted to cooperate with suitable cam means whereby the desired movement is imparted to the projecting tooth wheel engaging finger 163. The opposed projections 164 and 165 are engaged by cams to impart radial movement to the lever, and projection 168 is engaged by a cam to impart angular or pivotal movement to the lever.

The arrangement of the cams and lever may be noted best from Figs. 14, 15 and 17 to 20, inclusive. From Fig. 16 it may be seen that the lever 157 is mounted on the bearing bushing 36 in such manner that the projecting finger 163 extends toward the teeth 45 in wheel 43 and when in the position shown the finger 163 extends between adjacent teeth on the wheel.

To actuate the lever there are provided two cams 171 and 172 mounted on a secondary cam shaft 173 journaled for rotation upon the supports 25 and 32. A spur gear 174 is fixed to the shaft and is in engagement with a pinion gear 175 mounted on the end of the drive shaft 29 so that whenever the motor is energized the secondary cam shaft is rotated at constant speed.

The cams are mounted substantially centrally between the various projections on the escapement lever. The cam 171 lies in the plane of the projection 168 and cooperates therewith to impart angular movement to the lever. The cam 172 lies in the plane of the projection 164 and cooperates therewith to impart radial movement to the lever in a direction away from the axis of rotation of the main cam shaft 35. The cams 171 and 172 carry a pin 176 adapted to engage projection 166 to move the lever radially toward the axis and to engage projection 167 to prevent radial movement of the lever during a portion of the cyclic operation. The pin 176 also serves to maintain the cams 171 and 172 in predetermined angular relation to each other.

The escapement lever is forced to follow cam 171 by a substantially U-shaped spring 181 movably secured at one end to an extension 182 of the intermediate support 32 and at its other end to the outer end of the base portion 157 of the escapement lever.

A lock 127 is provided, as in the first described modification, for the purpose of limiting movement of the wheel to one tooth at a time. The lock is formed at the end of a flexible arm 128 mounted upon a stud 129 carried upon the rear support.

Before describing the cycle of operation of the escapement mechanism, it may be well to note the forms of the respective cams. Cam 171 has only a single step 191 constructed in such manner that it fits closely about the projection 168 (see Fig. 18) in a certain phase of the cycle. Starting from the tip of the step 191 and proceeding in a counterclockwise direction, the first 50° is made with a constant radius, the next 275° is made with a constant rise and the final 35° with a constant radius. This construction thus prevents angular motion of the lever while the lever is being moved radially inward by engagement of pin 176 with surface 166 and radially outward by engagement of cam 172 with projection 164.

The construction of the cam surfaces and the arrangement of the various parts of the escapement mechanism may be understood better from a description of the operation thereof when the cams are rotated by the motor. In this description, reference is had to Figs. 17 to 20, inclusive.

Referring first to Fig. 17 the parts are shown in the positions they have when the escapement lever is in its extreme counterclockwise and outermost position and with respect to the axis of rotation of cam shaft 35 (or the bearing bushing 36). At this time the finger has been moved between adjacent teeth 45 and has moved the lock 127 from that position. The outermost tip of cam 172 is in engagement with projection 164 and the highest portion of cam 171 is in engagement with projection 168.

Rotation of the cams in a clockwise direction enables spring 181 to move the escapement lever in a clockwise direction, thereby moving the tooth wheel 43 in the same direction. The lock 127 falls into the succeeding space and prevents undesired rotation of the wheel. At this time the mechanism is in the position illustrated in Fig. 18, with the pin 176 about to engage the projecting curved surface 166.

Continued rotation of the cams with pin 176 in engagement with the surface 166 and cam 171 in engagement with projection 168 results in the movement of the lever radially inward to the position shown in Fig. 19 and the withdrawal of finger 163 from between the teeth on the wheel. At this time the 50° constant radius portion of cam 171 is in engagement with projection 168 so that there is no angular movement of the lever. In the position indicated, the pin is about to engage cam surface 167, thereby preventing radial movement of the lever.

Further rotation of the cams brings the parts into the positions shown in Fig. 20. Cam 171 has moved the escapement lever in a counterclockwise position to its extreme position and cam 172 is about to engage projection 164 to move the lever radially outward into the position of Fig. 17. During the outward radial movement of the escapement lever, the latter is prevented from moving angularly by the 35° constant radius portion of cam 171.

It may be seen that the finger 163 moves in a closed path similar to that of the finger 125 of the first described modification and that it imparts movement to the wheel during only a portion of its movement.

The present invention is susceptible of modifications other than those described, and it is intended that the present invention is limited only by the following claims.

We claim:

1. Mechanism for operating a controller or the like comprising a rotatably mounted driven device provided with a ratchet, a drive member having a pawl yieldably drivably engaging said ratchet and provided at its periphery with equally-spaced openings, a holding device yieldingly urged against the periphery of said member and arranged to enter said openings successively to hold said member against angular movement, a driving device movable into said openings from the side opposite said holding device, and drive means for the driving device arranged (1) to operate it to push the holding device out of one of the openings and to seat in said one opening in place of the holding device, (2) to shift the driving device to move the drive member angularly with the holding device riding on its periphery until the holding member enters the next of said openings, (3) to withdraw the driving device from said one opening to disengage it from said drive member, and (4) to shift the driving device back to its initial position ready to push the holding device out of said next opening.

2. Mechanism for operating a controller or the like comprising a drive member provided at its periphery with equally-spaced openings, a holding device yieldingly urged against the periphery of said member and arranged to enter said openings successively to hold said member against angular movement, a driving device movable into said openings from the side opposite said holding device, and drive means for the driving device arranged (1) to operate it to push the holding device out of one of the openings and to seat in said one opening in place of the holding device, (2) to shift the driving device to move the drive member angularly with the holding device riding on its periphery until the holding member enters the next of said openings, (3) to withdraw the driving device from said one opening to disengage it from said drive member, and (4) to shift the driving device back to its initial position ready to push the holding device out of said next opening.

3. Mechanism for operating a controller or the like comprising a drive member provided at its periphery with equally-spaced openings, a holding device yieldingly urged against the periphery of said member and arranged to enter said openings successively to hold said member against angular movement, a driving device movable into said openings from the side opposite said holding device, and drive means for the driving device arranged (1) to operate it to push the holding device out of one of the openings and to seat in said one opening in place of the holding device, (2) to shift the driving device to move the drive member angularly with the holding device riding on its periphery until the holding member enters the next of said openings, (3) to withdraw the driving device from said one opening to disengage it from said drive member, and (4) to shift the driving device back to its initial position ready to push the holding device out of said next opening, said drive means comprising two cams one of which controls movements (1) and (3) of said driving device and the other of which controls movements (2) and (4) of the driving device.

4. Mechanism for operating a controller or the like comprising a drive member provided at its periphery with equally-spaced openings, a holding device yieldingly urged against the periphery of said member and arranged to enter said openings successively to hold said member against angular movement, a driving device movable into said openings from the side opposite said holding device, and drive means for the driving device arranged (1) to operate it to push the holding device out of one of the openings and to seat in said one opening in place of the holding device, (2) to shift the driving device to move the drive member angularly with the holding device riding on its periphery until the holding member enters the next of said openings, (3) to withdraw the driving device from said one opening to disengage it from said drive member, and (4) to shift the driving device back to its initial position ready to push the holding device out of said next opening, said drive means comprising two cams one of which controls movements (1) and (3) of said driving device and the other of which controls movements (2) and (4) of the driving device and said driving device comprising a bodily and angularly movable lever having parts engaging and guided by said cams.

5. Mechanism for operating a controller or the like comprising a drive member provided at its periphery with equally-spaced openings, a holding device yieldingly urged against the periphery of said member and arranged to enter said openings successively to hold said member against angular movement, a driving device movable into said openings from the side opposite said holding device, and drive means for the driving device arranged (1) to operate it to push the holding device out of one of the openings and to seat in said one opening in place of the holding device, (2) to shift the driving device to move the drive member angularly with the holding device riding on its periphery until the holding member enters the next of said openings, (3) to withdraw the driving device from said one opening to disengage it from said drive member, and (4) to shift the driving device back to its initial position ready to push the holding device out of said next opening, said drive means comprising two cams one of which controls movements (1) and (3) of said driving device and the other of which controls movements (2) and (4) of the driving device and said driving device comprising an oscillating lever mounted on an angularly movable lever, said levers engaging and operated by said cams respectively.

6. Operating mechanism comprising a rotatable drive member having a peripheral generally cylindrical flange formed with a series of openings, a lever inside of said flange having means radially engageable with and disengageable from said openings by bodily movement of the lever and mounted for oscillation angularly, and means for oscillating said lever and moving it bodily in opposite directions at opposite ends of its stroke intermittently to drive said member.

7. Operating mechanism comprising a rotatable drive member having a peripheral generally cylindrical flange formed with a series of openings, a lever inside of said flange having means radially engageable with and disengageable from said openings by bodily movement of the lever and mounted for oscillation angularly, means for oscillating said lever and moving it bodily in opposite directions at opposite ends of its stroke intermittently to drive said member, and means for holding said member when it is not being so driven.

8. Operating mechanism comprising a rotatable drive member having a peripheral generally cylindrical flange formed with a series of openings, a lever inside of said flange having means radially engageable with and disengageable from said openings by bodily movement of the lever and mounted for oscillation angularly, means for oscillating said lever, and a cam for shifting the lever bodily in opposite directions at opposite ends of its stroke, to drive said member forward intermittently.

9. Operating mechanism comprising a drive member formed with a series of openings, an oscillating lever having pivoted thereon a second lever provided with a device movable into and out of said openings successively, a cam for oscillating the first lever, a second cam for moving the second lever relatively to the first lever, and a tensioned spring having connected thereto a part pivoted on one lever and engaging the other lever, and whereby said spring holds both levers against their cams.

10. In combination, a rotary circuit controller comprising a shaft mounted for rotation in a pair of supports, a coaxially mounted tooth wheel operably connected to said shaft and adapted to impart movement thereto, a walking beam pivotally mounted coaxially to said shaft, said beam having a length greater than the radius of said wheel and provided with a shoulder intermediate the pivot point and periphery of the wheel, an escapement lever pivotally mounted on the free end of said lever, said lever extending toward the axis of the shaft and having a pair of projections, the first of which extends radially outward toward the toothed portion of said wheel and provided with a portion adapted to extend a predetermined distance between the teeth on said wheel, and the second of which extends substantially at right angles to said beam and coincides with the shoulder formed on the beam, a single step cam for actuating said beam, a two-step cam for actuating said escapement lever, a spring clip pivotally mounted at the free end of said beam for maintaining the shoulder of said beam and the second mentioned projection of said lever in engagement with their respective cams, and means for rotating said cams, said cams being so constructed that the first mentioned projection on said lever is moved between successive teeth about its pivot point when said beam is stationary, then moved to rotate said wheel by movement of said beam about its pivot, then moved out of a position between the teeth by movement in the opposite direction about its pivot, and then returned to its original position by movement of both beam and lever about their respective pivot points.

11. In combination, a pair of spaced apart front and rear supports having an intermediate support located therebetween and supported by the rear support, a controller mounted for rotation in said front and intermediate supports, means including a wheel having axially projecting teeth loosely mounted on said shaft and connected to said shaft through a one-way drive operable to transmit movement to said shaft, a constant speed motor secured adjacent said rear support, means mounted between said rear and intermediate plates and driven by said motor for periodically actuating said wheel a predetermined distance in said one direction, said means including a lever pivotally mounted coaxially of said shaft on said intermediate support, a shoulder formed intermediate the end of said lever, a second lever pivotally mounted on the free end of said first mentioned lever and extending radially toward the axis of said shaft, a projecting shoulder formed thereon correspondingly located adjacent the first mentioned shoulder, a second projection formed thereon projecting radially outward and adapted to enter between the teeth formed on said wheel, a cam driven by said motor adapted to engage the first shoulder, a second cam driven by said motor adapted to engage the second shoulder, means including a spring acting on said second lever adapted to maintain the shoulders in engagement with their respective cams, said cams and shoulders being so constructed and arranged that the radially outward extending projection is moved radially in between the teeth by said second mentioned lever, then angularly in said one direction by the action of the spring on said first mentioned lever, then radially out of position in between the teeth by said second mentioned lever, and finally returned to its initial position by the action of the cam on the second mentioned lever.

12. In apparatus of the type described, the combination including a controller, means operatively connected to said controller operable to impart movement thereto, and means including a pair of cams and a lever having projecting portions engaging each of said cams and mounted for both pivotal and longitudinal movement for periodically actuating said first mentioned means a predetermined distance.

13. In apparatus of the type described, the combination including a controller, means operatively connected to said controller operable to impart movement thereto, and means for periodically rotating said first mentioned means a predetermined distance, said means including, a lever mounted for pivotal and radial movement about a fixed support, a pair of oppositely disposed projections, a cam between and adapted to engage said projections for imparting radial movement to said lever, a third projection transverse to said first mentioned projection, and a cam adapted to engage said third projection for imparting angular movement to said lever about said pivot.

14. In apparatus of the type described, the combination including a rotary controller, means operatively connected to said controller operable to impart movement thereto, and means including a pair of cams, a lever having projecting portions engaging each of said cams and mounted for both angular and longitudinal movement, and spring means maintaining said lever in engagement with one of said cams for periodically rotating said first mentioned means a predetermined distance.

15. In apparatus of the type described, the combination including a rotary controller, a tooth wheel operatively connected to said controller operable to impart movement thereto, and means for periodically rotating said wheel a predetermined distance, said last mentioned means including a lever mounted for pivotal and radial movement substantially coaxially of said wheel, a pair of radially disposed projections on said lever, a transversely extending projection on said lever, a third radially disposed projection adapted to fit a predetermined distance between the teeth on said wheel, a cam and pin carried thereby adapted to engage respective ones of said pair of projections for moving said last named projection into and out of position between said teeth, a second cam adapted to engage said transversely extending projection to move said last mentioned projection angularly, spring means for maintaining said transversely extending projection in engagement with its associated cam, said cams and projections on said lever being so constructed and arranged that the last mentioned projection is alternately moved radially into and out of a position between the teeth on said wheel and angularly when in said positions.

16. In combination, a rotary circuit conner comprising a shaft mounted for rotation in a pair of supports, a coaxially mounted tooth wheel operably connected to said shaft and adapted to impart movement thereto, a pivot pin located substantially coaxially to said shaft, a lever mounted thereon for pivotal and radial movement, said lever having a projection formed at its outer extremity adapted to enter a predetermined distance between the teeth on said wheel, a pair of projections extending toward each other formed intermediate the ends of said lever and displaced from the plane of the lever, a third projection intermediate the pair and lying in the plane of the lever, a cam wheel disposed between the pair of projections, said cam wheel being adapted to engage one of said projections and being provided with a pin adapted to engage the other whereby said lever is moved radially, a second cam wheel adapted to engage the third projection, spring means for maintaining said third projection in engagement with the second cam, the cams and levers being so constructed and arranged that the outer projection is moved radially into position between the teeth by said first mentioned cam, then angularly by the spring, then radially out of position between the teeth by the pin and angularly back to its original position by the second mentioned cam.

17. In combination, a pair of spaced apart front and rear supports having an intermediate support located therebetween and supported by the rear support, a multiple circuit controller comprising a plurality of cams secured to a shaft journaled for rotation in said front and intermediate supports, means including a wheel having axially projecting teeth loosely mounted on said shaft and connected to said shaft through a one-way drive operable to transmit movement to said shaft, a constant speed motor secured adjacent said rear support, means mounted between said rear and intermediate supports and driven by said motor for periodically actuating said wheel a predetermined distance in said one direction, said means including a lever mounted coaxially of said shaft on said intermediate support for both angular and radial movement, said lever having a pair of projections displaced from the plane of the lever and extending toward each other, a projection intermediate the pair of projections lying in the plane of the lever, and a projection adapted to enter between the teeth of said wheel, a cam driven by said motor and pin carried thereby adapted to engage said pair of projections for moving said lever radially whereby said last mentioned projection is alternately moved between said teeth, a second cam driven by said motor adapted to engage said intermediate projection for actuating said lever when said last mentioned projection is out of a position between the teeth, and spring means for actuating said lever in said one direction when said last mentioned projection is between the teeth.

18. In combination, rotatable control means, means operable to rotate said control means, means including a mechanism having a portion movable in a closed path and adapted to rotate said last mentioned means during a portion of its travel in said closed path for periodically rotating said means a predetermined distance, constant speed means for driving said mechanism, and manually operable means for rotating said control means independently of said mechanism.

19. In apparatus of the type described the combination, a cam having integral ratchet teeth formed on its side, a rotatably mounted shaft mounting said cam, a toothed wheel rotatably mounted on said shaft adjacent the toothed cam, resilient pawls carried by said wheel and adapted to engage said ratchet teeth, and an escapement mechanism adapted periodically to rotate said wheel for imparting rotation to said shaft through said pawls and ratchet teeth.

RAY W. SCOTT.
ANDREW O. McCOLLUM.